(12) United States Patent
Ryu et al.

(10) Patent No.: US 12,388,995 B2
(45) Date of Patent: *Aug. 12, 2025

(54) VIDEO CODING METHOD AND APPARATUS USING ANY TYPES OF BLOCK PARTITIONING

(71) Applicant: Dolby Laboratories Licensing Corporation, San Francisco, CA (US)

(72) Inventors: Ho Chan Ryu, Seoul (KR); Yong Jo Ahn, Seoul (KR)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,309

(22) Filed: Nov. 29, 2023

(65) Prior Publication Data

US 2024/0098264 A1    Mar. 21, 2024

Related U.S. Application Data

(63) Continuation of application No. 18/063,404, filed on Dec. 8, 2022, now Pat. No. 11,870,990, which is a
(Continued)

(30) Foreign Application Priority Data

Oct. 26, 2016    (KR) .......................... 10-2016-0139982

(51) Int. Cl.
*H04N 19/119*    (2014.01)
*H04N 19/176*    (2014.01)
(Continued)

(52) U.S. Cl.
CPC ......... *H04N 19/119* (2014.11); *H04N 19/176* (2014.11); *H04N 19/46* (2014.11); *H04N 19/66* (2014.11)

(58) Field of Classification Search
CPC .... H04N 19/119; H04N 19/176; H04N 19/46; H04N 19/66; H04N 19/70; H04N 19/96
See application file for complete search history.

(56) References Cited

U.S. PATENT DOCUMENTS 9,661,324 B2    5/2017    Lim et al.
9,819,965 B2    11/2017   Puri et al.
(Continued)

FOREIGN PATENT DOCUMENTS

CA    2795414 A1    4/2013
CN    103250416 A    8/2013
(Continued)

OTHER PUBLICATIONS

Chinese Patent Office Action for Related Application No. 201680090340.5 dated Nov. 13, 2023 (14 pages, with English translation).
(Continued)

*Primary Examiner* — Jessica M Prince
(74) *Attorney, Agent, or Firm* — Michael Best & Friedrich LLP

(57) ABSTRACT

The present invention relates to a block partitioning structure in video coding technology, and a video encoding and decoding method and apparatus using the same, wherein the video encoding and decoding method includes the steps of: acquiring quad-partitioning information of a block; acquiring bi-partitioning information of the block when the acquired quad-partitioning information of the block does not indicate four partitions; acquiring partitioning direction information for bi-partitioning of the block when the acquired bi-partitioning information of the block indicates two partitions; acquiring information on whether to perform any other type of partitioning, when the acquired bi-partitioning information of the block does not indicate two partitions; and acquiring additional information required for
(Continued)

the any other type of partitioning, when the acquired information on whether to perform any other type of partitioning indicates that the any other type of partitioning is performed.

15 Claims, 10 Drawing Sheets

Related U.S. Application Data continuation of application No. 17/363,777, filed on Jun. 30, 2021, now Pat. No. 11,563,941, which is a continuation of application No. 16/395,109, filed on Apr. 25, 2019, now Pat. No. 11,070,800, which is a continuation of application No. PCT/KR2016/012111, filed on Oct. 27, 2016.

(51) Int. Cl.
*H04N 19/46* (2014.01)
*H04N 19/66* (2014.01)

(56) References Cited

U.S. PATENT DOCUMENTS

| | | | |
|---|---|---|---|
| 11,070,800 B2 | 7/2021 | Ryu et al. | |
| 11,563,941 B2 | 1/2023 | Ryu et al. | |
| 2009/0196342 A1 | 8/2009 | Divorra Escoda et al. | |
| 2011/0134998 A1 | 6/2011 | Lee et al. | |
| 2011/0292999 A1 | 12/2011 | Jeong et al. | |
| 2012/0106627 A1 | 5/2012 | Guo et al. | |
| 2012/0114043 A1 | 5/2012 | Lee et al. | |
| 2013/0028529 A1 | 1/2013 | Lim et al. | |
| 2013/0142259 A1 | 6/2013 | Lim et al. | |
| 2013/0279577 A1 | 10/2013 | Schwarz et al. | |
| 2014/0205006 A1 | 7/2014 | Jeong et al. | |
| 2014/0328387 A1 | 11/2014 | Puri et al. | |
| 2014/0328400 A1 | 11/2014 | Puri et al. | |
| 2015/0319433 A1 | 11/2015 | Lim et al. | |
| 2016/0353113 A1* | 12/2016 | Zhang | H04N 19/91 |
| 2017/0208336 A1* | 7/2017 | Li | H04N 19/176 |
| 2017/0347128 A1 | 11/2017 | Panopone et al. | |
| 2017/0353721 A1* | 12/2017 | Piao | H04N 19/96 |
| 2018/0176601 A1 | 6/2018 | Jeong et al. | |
| 2019/0215537 A1 | 7/2019 | Poirier et al. | |
| 2019/0281297 A1 | 9/2019 | Lee | |
| 2020/0267418 A1* | 8/2020 | Chuang | H04N 19/593 |

FOREIGN PATENT DOCUMENTS

| | | |
|---|---|---|
| CN | 104869405 A | 8/2015 |
| KR | 20110086521 A | 7/2011 |
| KR | 101478959 B1 | 1/2015 |
| KR | 101513891 B1 | 4/2015 |
| KR | 20150056610 A | 5/2015 |
| KR | 20150075065 A | 7/2015 |

OTHER PUBLICATIONS

Chinese Patent Office Action for Related Application No. 201680090340.5 dated Oct. 10, 2022 (13 pages, including an English translation).
Intellectual Discovery Co., International Search Report, PCT/KR2016/012111, Jul. 24, 2017, 20 pgs.
Li, X. et al. Multi-Type-Tree. Document: JVET-D0117r1. Joint Video Exploration Team (JVET) of ITU-T SG 16 WP 3 and ISO/IEC JTC 1/SC 29/WG 11. 4th Meeting: Chengdu, CN, Oct. 15-21, 2016 (3 pages).
Karczewicz, M. et al. Video coding technology proposal by Qualcomm Inc. Document: JCTVC-A121. Joint Collaborative Team on Video Coding (JCT-VC) of ITU-T SG16 WP3 and ISO/IEC JTC1/SC29/WG11. 1st Meeting: Dresden, DE, Apr. 15-23, 2010 (24 pages).

\* cited by examiner

| coding_unit( x0, y0, log2CbSize ) { | Descriptor |
|---|---|
|   if( x0+( 1<<log2CbSize ) <= pic_width_in_luma_samples &&<br>    y0+( 1<<log2CbSize ) <= pic_height_in_luma_samples &&<br>    log2CbSize > MinCbLog2SizeY ) { | |
|     split_cu_flag[x0][y0] | ae(v) |
|   if( !split_cu_flag[x0][y0] ) { | |
|     binary_split_flag[x0][y0] | ae(v) |
|     if( binary_split_flag[x0][y0] ) { | |
|       binary_direction_flag[x0][y0] | ae(v) |
|     } | |
|     else { | |
|       arbitrary_split_flag[x0][y0] | ae(v) |
|       if( arbitrary_split_flag[x0][y0] ) { | |
|         arbitrary_angle[x0][y0] | ae(v) |
|         arbitrary_distance[x0][y0] | ae(v) |
|       } | |
|     } | |
|   } | |
|   ... | |
| } | |

FIG. 7

| | |
|---|---|
| coding_unit( x0, y0, log2CbSize ) { | Descriptor |
|   if( x0+(1<<log2CbSize) <= pic_width_in_luma_samples &&<br>    y0+(1<<log2CbSize) <= pic_height_in_luma_samples &&<br>    log2CbSize > MinCbLog2SizeY ) { | |
|     split_cu_flag[x0][y0] | ae(v) |
|   if( !split_cu_flag[x0][y0] ) { | |
|     split_pred_flag[x0][y0] | ae(v) |
|     if( split_pred_flag[x0][y0] ) { | |
|       pred_direction_flag[x0][y0] | ae(v) |
|       split_type_flag[x0][y0] | ae(v) |
|     } | |
|     else { | |
|       arbitrary_split_flag[x0][y0] | ae(v) |
|       if( arbitrary_split_flag[x0][y0] ) { | |
|         arbitrary_angle[x0][y0] | ae(v) |
|         arbitrary_distance[x0][y0] | ae(v) |
|       } | |
|     } | |
|   } | |
|   } | |
|   ... | |
| } | |

VIDEO CODING METHOD AND APPARATUS USING ANY TYPES OF BLOCK PARTITIONING

RELATED APPLICATIONS

This is a continuation of U.S. application Ser. No. 18/063,404, filed Dec. 8, 2022, which is a continuation of U.S. application Ser. No. 17/363,777, filed Jun. 30, 2021, now U.S. Pat. No. 11,563,941, which is a continuation of U.S. patent application Ser. No. 16/395,109 filed Apr. 25, 2019, now U.S. Pat. No. 11,070,800, which is a continuation application of the International Patent Application Serial No. PCT/KR2016/012111, filed Oct. 27, 2016, which claims priority to the Korean Patent Application Serial No. 10-2016-0139982, filed Oct. 26, 2016, the entire disclosures of which are incorporated herein by reference for all purposes.

TECHNICAL FIELD

The present invention relates to an image processing scheme and, more particularly, to a method and apparatus for describing a block partitioning structure and performing partitioning on the block partitioning structure in a video compression scheme.

BACKGROUND

The demand for multimedia data is increasing due to diversification and miniaturization of multimedia devices, and thus there has been a need for a high efficiency video compression technology for next generation video services. Based on such a need, the MPEG and VCEG jointly established the Joint Collaborative Team on Video Coding (JCT-VC) for the video compression standardization of H.264/AVC, and established in January 2013 the standardization for HEVC, which is the latest international video compression standard.

In video compression technology, a block partitioning structure refers to a unit in which encoding and decoding are performed, and a unit to which main encoding and decoding technologies such as prediction and transform are applied. As the video compression technology develops, the magnitude of blocks for performing encoding and decoding is gradually increasing, and in terms of block partitioning forms, more various partitioning types are supported. In addition, video compression is performed using units subdivided according to roles of blocks as well as units for performing encoding and decoding. In the HEVC standard, video coding and decoding are performed using unit blocks subdivided according to a block partitioning structure of a quad-tree type and roles of prediction and transform. In addition, various forms of block partitioning structures such as a Quad-Tree plus Binary-Tree (QTBT) which is a form of a combination of a quad-tree and a binary-tree, a block partitioning structure of any form, and the like have been proposed for improving video encoding efficiency.

SUMMARY

It is an object of the present invention to provide a method and an apparatus capable of improving encoding efficiency compared to the existing video compression schemes by which various block partitioning structures are used in combination.

However, the technical problem to be solved by this embodiment is not limited to the above-described technical problems, and other technical problems may exist.

In order to achieve the object, a video encoding and decoding method and apparatus according to an embodiment of the present invention includes acquiring quad-partitioning information of a block; acquiring bi-partitioning information of the block, when the acquired quad-partitioning information of the block does not indicate four partitions; acquiring partitioning direction information for bi-partitioning of the block, when the acquired bi-partitioning information of the block indicates two partitions; acquiring information on whether to perform arbitrary partitioning, when the acquired bi-partitioning information of the block does not indicate two partitions; and acquiring additional information required for the arbitrary partitioning, when the acquired information on whether to perform the arbitrary partitioning indicates that the arbitrary partitioning is performed.

In order to achieve the object, a video encoding and decoding method and apparatus according to an embodiment of the present invention includes acquiring quad-partitioning information of a block; acquiring bi-partitioning and tri-partitioning information of the block, when the acquired quad-partitioning information of the block does not indicate four partitions; acquiring partitioning direction information for bi-partitioning and tri-partitioning of the block, when the acquired bi-partitioning and tri-partitioning information of the block indicates two partitions and three partitions; acquiring information for selecting one of the bi-partitioning and the tri-partitioning, when the acquired bi-partitioning and tri-partitioning information of the block indicates two partitions and three partitions; acquiring information on whether to perform arbitrary partitioning, when the acquired bi-partitioning information of the block does not indicate two partitions; and acquiring additional information required for the arbitrary partitioning, when the acquired information on whether to perform the arbitrary partitioning indicates that the arbitrary partitioning is performed.

According to the present invention, it is possible to provide video coding method and apparatus capable of efficiently performing block partitioning and improving the encoding efficiency through the block partitioning, by using various block structures in combination.

According to an embodiment of the present invention, it is possible to improve the encoding performance by using various block partitioning types in combination.

BRIEF DESCRIPTION OF DRAWINGS

FIG. 7 is a table illustrating a syntax using arbitrary block partitioning in a block structure of a form in which bi-partitioning and quad-partitioning are combined according to an embodiment of the present invention.

FIG. 8 is a table illustrating a syntax using arbitrary block partitioning in a block structure of a form in which bi-partitioning, tri-partitioning, and quad-partitioning are combined according to an embodiment of the present invention.

DETAILED DESCRIPTION

Figure 1:
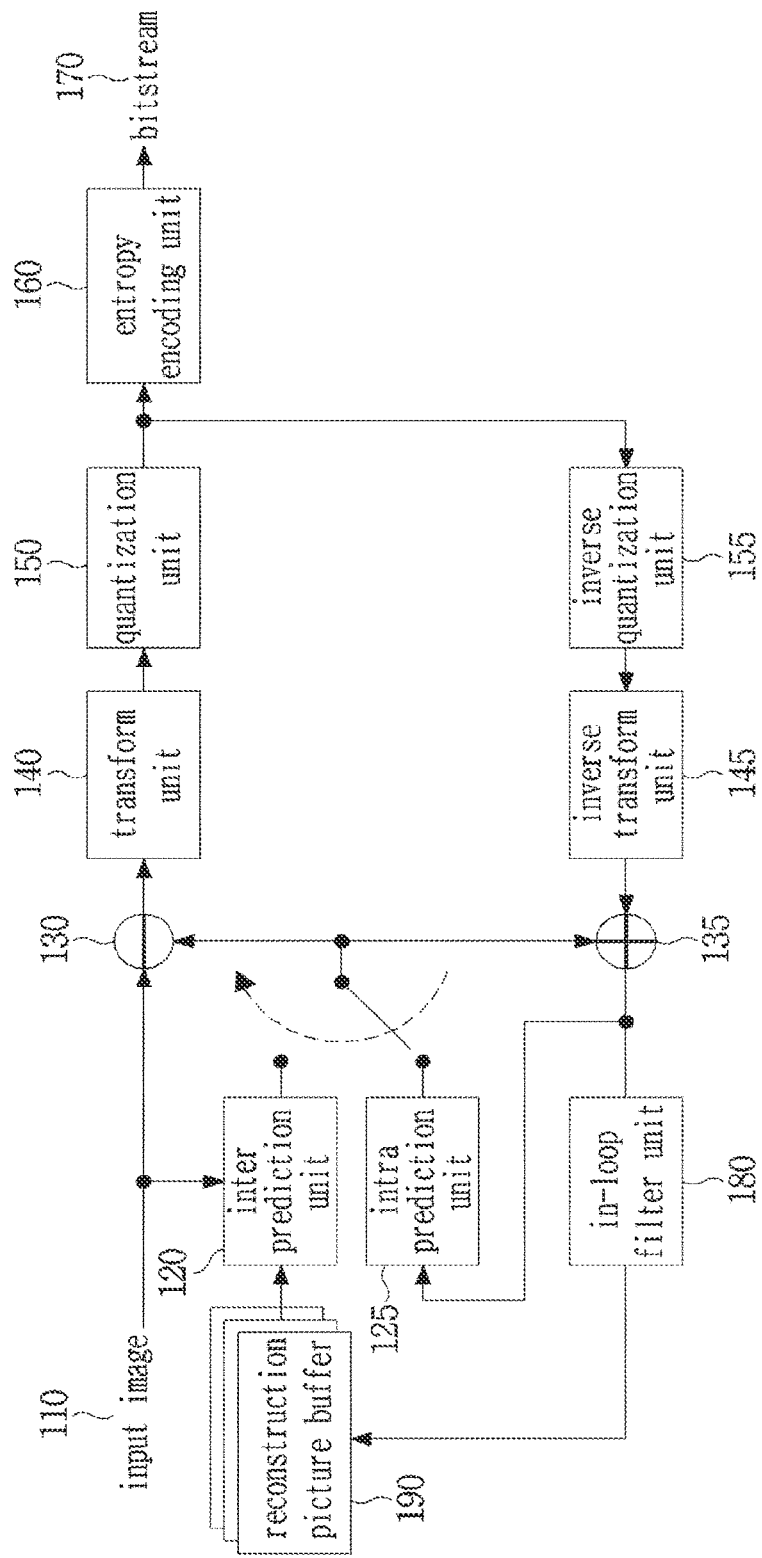
FIG. 1 is a block diagram illustrating a configuration of a video encoding apparatus according to an embodiment of the present invention.

Hereinafter, embodiments of the present invention will be described in detail with reference to the drawings attached thereto, so that those skilled in the art can easily carry out the present invention. The present invention may, however, be embodied in many different forms and should not be construed as limited to the embodiments set forth herein. In order to clearly illustrate the present invention, parts not related to the description are omitted, and similar parts are denoted by like reference characters throughout the specification.

Throughout this specification, when a part is referred to as being 'connected' to another part, it includes not only a case where they are directly connected but also a case where the part is electrically connected with another part in between.

In addition, when a part is referred to as 'comprising' an element throughout the specification, it is understood that the element may include other elements as well, without departing from the other elements unless specifically stated otherwise.

The term 'a step of doing something' or 'a step of something' used throughout this specification does not mean a step for something.

Also, the terms first, second, etc. may be used to describe various components, but the components should not be limited by the terms. The terms are used only for the purpose of distinguishing one component from another.

In addition, the components shown in the embodiments of the present invention are shown independently to represent different characteristic functions, but that does not mean that each component consists of separate hardware or one software constituent unit. That is, each component is described by arranging each component for convenience of explanation, and at least two components of components may be combined to form one component or one component may be partitioned into a plurality of components to perform functions. The integrated embodiments and the separate embodiments of each of these components are also included in the scope of the present invention without departing from the essence of the present invention.

Hereinafter, in various embodiments of the present invention disclosed herein, an encoding block or an encoding unit may be generically referred to as including a single block or unit in which encoding and decoding are performed in video coding. The encoding block or the encoding unit is not limited to one single block, but may be collectively referred to as including the block that is partitioned with a plurality of depths.

Hereinafter, video coding method and apparatus using arbitrary block partitioning according to an embodiment of the present invention will be described in detail with reference to FIG. 9.

Figure 9:
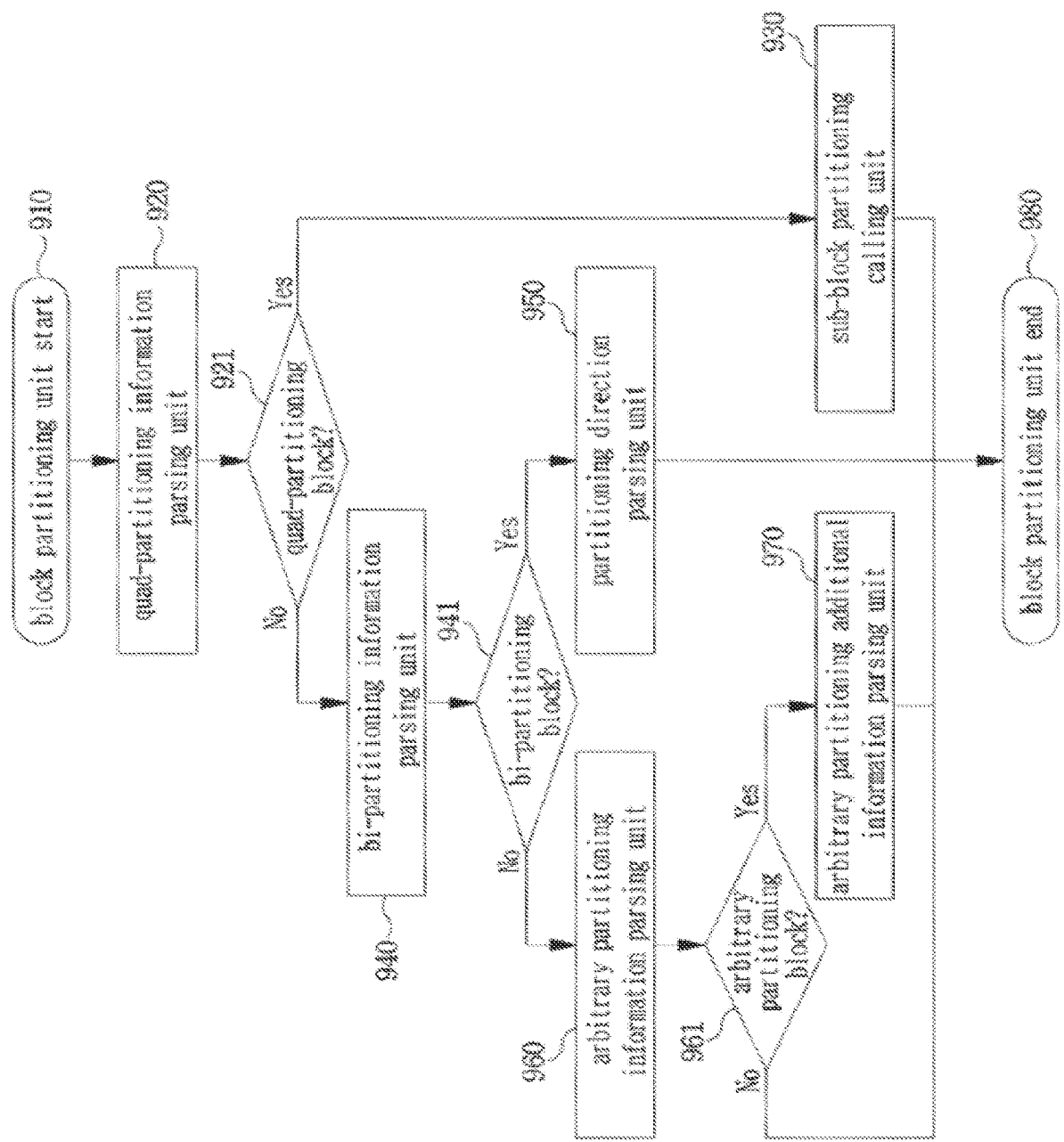
FIG. 9 is a flowchart illustrating the use of arbitrary block partitioning in a block structure of a form in which bi-partitioning and quad-partitioning are combined according to an embodiment of the present invention.

FIG. 9 is a flowchart illustrating the use of arbitrary block partitioning in a block structure of a form in which bi-partitioning and quad-partitioning are combined according to an embodiment of the present invention.

In a video coding method and apparatus using arbitrary block partitioning according to an embodiment, a block partitioning unit for acquiring information on block partitioning and performing partitioning includes a quad-partitioning information parsing unit 920, a sub-block partitioning calling unit 930, a bi-partitioning information parsing unit 940, a partitioning direction parsing unit 950, an information parsing unit 960 for arbitrary partitioning, and an additional information parsing unit 970 for arbitrary partitioning.

The quad-partitioning information parsing unit 920 acquires block quad-partitioning information by parsing block partitioning information on whether to perform quad-partitioning for a block from a bitstream.

When the block quad-partitioning information acquired by the quad-partitioning information parsing unit 920 indicates four partitions, the sub-block partitioning calling unit 930 serves to call sub-block partitioning in order to perform partitioning on four sub-blocks.

When the block quad-partitioning information acquired by the quad-partitioning information parsing unit 920 does not indicate four partitions, the bi-partitioning information parsing unit 940 acquires block bi-partitioning information by parsing block partitioning information on whether to perform bi-partitioning for the block from the bitstream.

When the block bi-partitioning information acquired by the bi-partitioning information parsing unit 940 indicates two partitions, the partitioning direction parsing unit 950 acquires information on a direction of block bi-partitioning, that is, a direction indicating one of a vertical direction and a horizontal direction.

When the block bi-partitioning information acquired by the bi-partitioning information parsing unit 940 does not indicate two partitions, the information parsing unit 960 for arbitrary partitioning determines whether arbitrary partitioning is performed on the current coding block.

When the arbitrary partitioning information acquired by the information parsing unit 960 for arbitrary partitioning performs arbitrary partitioning on the current coding block, the additional information parsing unit 970 for arbitrary partitioning acquires additional information on arbitrary partitioning. The additional information for arbitrary partitioning may include angle and distance information used for arbitrary partitioning.

Hereinafter, embodiments of the present invention will be described in detail with reference to the drawings attached thereto, so that those skilled in the art can easily carry out the present invention. The present invention may, however, be embodied in many different forms and should not be construed as limited to the embodiments set forth herein. In order to clearly illustrate the present invention, parts not related to the description are omitted, and similar parts are denoted by like reference characters throughout the specification.

Throughout this specification, when a part is referred to as being 'connected' to another part, it includes not only a case where they are directly connected but also a case where the part is electrically connected with another part in between.

In addition, when a part is referred to as 'comprising' an element throughout the specification, it is understood that the element may include other elements as well, without departing from the other elements unless specifically stated otherwise.

The term 'a step of doing something' or 'a step of something' used throughout this specification does not mean a step for something.

Also, the terms first, second, etc. may be used to describe various components, but the components should not be limited by the terms. The terms are used only for the purpose of distinguishing one component from another.

In addition, the components shown in the embodiments of the present invention are shown independently to represent different characteristic functions, but that does not mean that each component consists of separate hardware or one software constituent unit. That is, each component is described by arranging each component for convenience of explanation, and at least two components of components may be combined to form one component or one component may be partitioned into a plurality of components to perform functions. The integrated embodiments and the separate embodiments of each of these components are also included in the scope of the present invention without departing from the essence of the present invention.

Hereinafter, in various embodiments of the present invention disclosed herein, an encoding block or an encoding unit may be generically referred to as including a single block or unit in which encoding and decoding are performed in video coding. The encoding block or the encoding unit is not limited to one single block, but may be collectively referred to as including that the block is partitioned with a plurality of depths.

Hereinafter, video coding method and apparatus using arbitrary block partitioning according to an embodiment of the present invention will be described in detail with reference to FIG. 9.

FIG. 1 is a block diagram illustrating a configuration of video encoding method and apparatus according to an embodiment of the present invention.

Video encoding method and apparatus according to an embodiment of the present invention may include an inter prediction unit 120, an intra prediction unit 125, a subtraction unit 130, a transform unit 140, a quantization unit 150, an entropy encoding unit 160, inverse transform unit 145, an inverse quantization unit 155, an adding unit 135, an in-loop filter unit 180, and a reconstructed picture buffer 190.

The inter prediction unit 120 performs motion prediction by using an input image 110 and a reconstructed image stored in the reconstructed picture buffer 190, thereby generating a prediction signal.

The intra prediction unit 125 performs spatial prediction by using pixel values of pre-reconstructed neighboring blocks that are adjacent to the current block to be encoded, thereby generating a prediction signal.

The subtraction unit 130 uses the input image and the prediction signal generated through the inter prediction unit 120 or the intra prediction unit 125 to generate a residual signal.

The transform unit 140 and the quantization unit 150 perform transform and quantization on the residual signal generated through the subtraction unit 130 to generate a quantized coefficient.

The entropy encoding unit 160 performs entropy encoding on encoding information such as syntax elements and quantized coefficients defined in the video encoder, thereby outputting the bitstream.

The inverse transform unit 145 and the inverse quantization unit 155 receive the quantized coefficients; and perform inverse quantization and inverse transform in order, thereby generating a reconstructed residual signal.

The adding unit 135 generates a reconstructed signal by using the prediction signal generated through the inter prediction unit 120 or the intra prediction unit 125 and the reconstructed residual signal.

The reconstructed signal is transmitted to the in-loop filter unit 180. The reconstructed picture to which the filtering is applied is stored in the reconstructed picture buffer 190, and may be used as a reference picture in the inter prediction unit 120.

Figure 2:
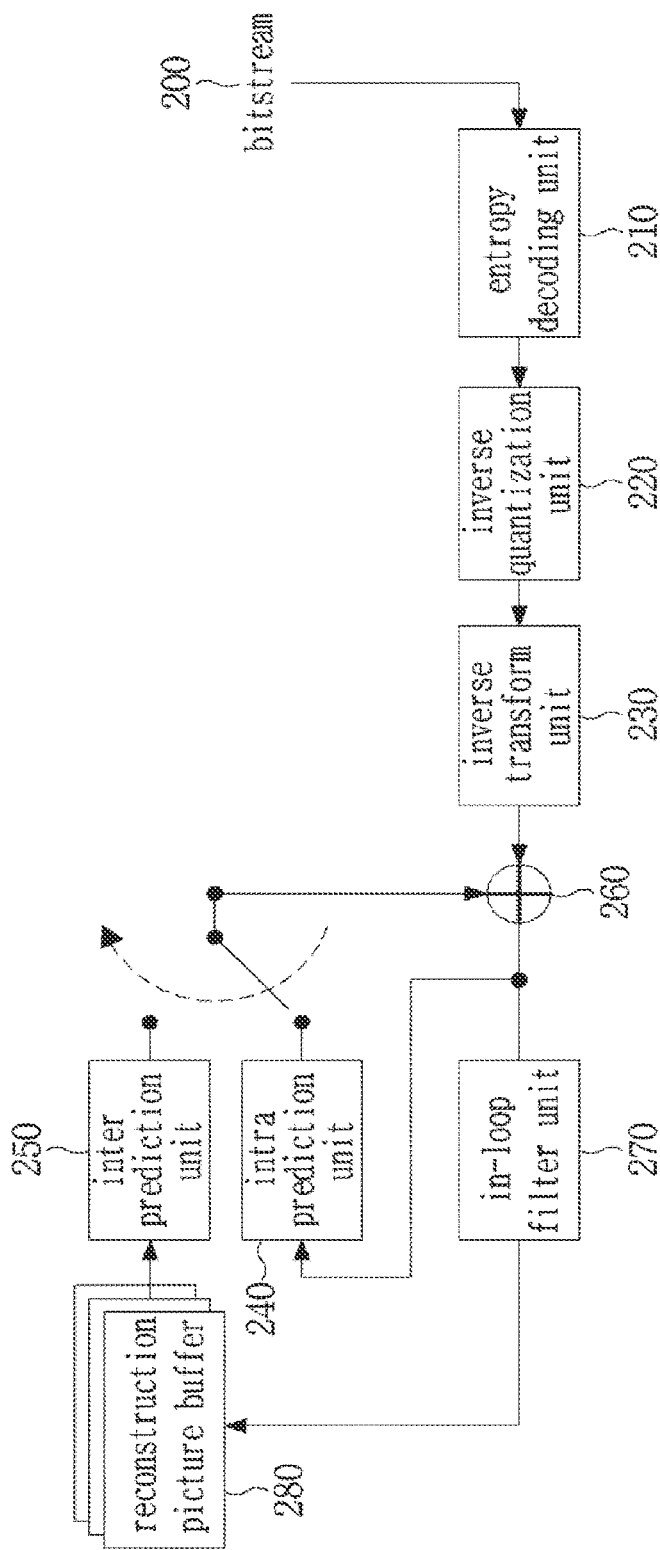
FIG. 2 is a block diagram illustrating a configuration of a video decoding apparatus according to an embodiment of the present invention.

FIG. 2 is a block diagram showing a configuration of video decoding apparatus and method according to an embodiment of the present invention.

The video decoding apparatus and method according to an embodiment includes an entropy decoding unit 210, an inverse quantization unit 220, an inverse transform unit 230, an intra prediction unit 240, an inter prediction unit 250, adding unit 260, an in-loop filter unit 270, and a reconstructed picture buffer 280.

The entropy decoding unit 210 decodes the input bitstream 200 and outputs decoding information such as syntax elements and quantized coefficients.

The inverse quantization unit 220 and the inverse transform unit 230 receive the quantized coefficients and perform inverse quantization and inverse transform in order, thereby outputting a residual signal.

The intra prediction unit 240 performs spatial prediction by using pixel values of the pre-reconstructed neighboring blocks adjacent to the current block to be decoded, thereby generating a prediction signal.

The inter prediction unit 250 performs motion compensation using motion vector extracted from the bitstream and a reconstructed picture stored in the reconstructed picture buffer 280, thereby generating a prediction signal.

The prediction signals output from the intra prediction unit 240 and the inter prediction unit 250 are summed with the residual signal through the adding unit 260, and accordingly the reconstructed signal generated on a per-block basis includes the reconstructed image.

The reconstructed image is transferred to the in-loop filter unit 270. The reconstructed picture to which the filtering is applied is stored in the reconstructed picture buffer 280 and may be used as a reference picture in the inter prediction unit 250.

Figure 3:
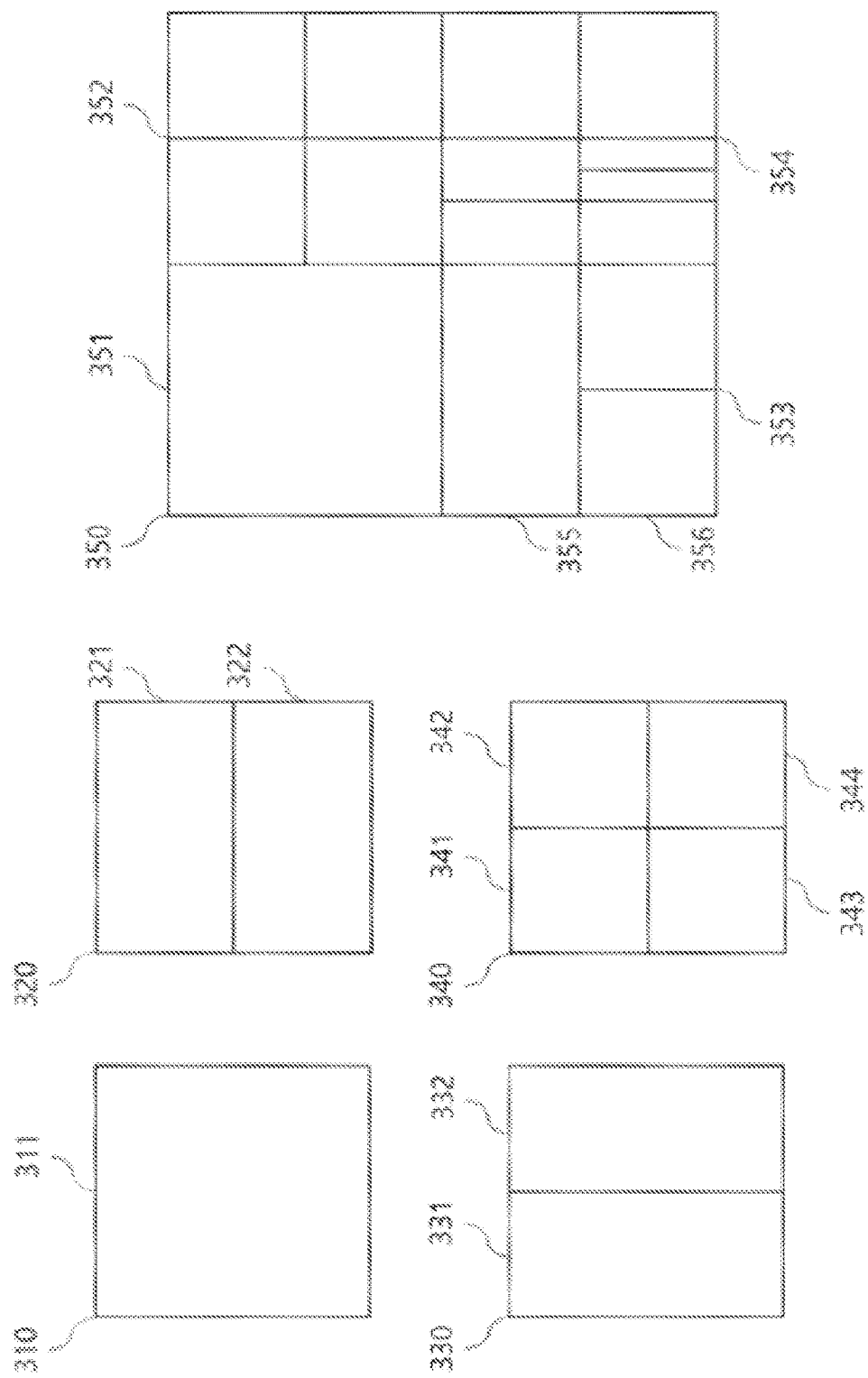
FIG. 3 is a conceptual diagram illustrating a block partitioning structure in which bi-partitioning and quad-partitioning are combined according to an embodiment of the present invention.

FIG. 3 is a conceptual diagram illustrating a block partitioning structure in which bi-partitioning and quad-partitioning are combined according to an embodiment of the present invention.

A video coding method and apparatus utilizing a combination of diverse block partitioning types according to an embodiment of the present invention includes a type of block partitioning including a non-partitioned block 310, a horizontally partitioned block 320, a vertically partitioned block 330, and a quad-partitioned block 340, and a block structure 350 of a type in which the diverse block partitionings are combined.

According to an embodiment of the present invention, the non-partitioned block 310 includes a type in which one coding block is not partitioned, and the horizontally partitioned block 320 includes a type in which one coding block is horizontally partitioned. In addition, according to an embodiment of the present invention, the vertically partitioned block 330 includes a type in which one coding block is vertically partitioned, and the quad-partitioned block 340 includes a type in which one coding block is vertically and horizontally partitioned. The one coding block includes both a square block and a non-square block.

According to an embodiment of the present invention, the block structure 350 of a type in which the diverse block partitionings are combined includes a block structure of a type in which blocks 310, 320, 330, and 340 of diverse block partitioning types are combined. In the block partitioning structure according to the embodiment, the most upper block 350 may be quad-partitioned into four partitioned blocks, i.e., a first partitioned block 351, a second partitioned block 352, a third partitioned block 353, and a fourth partitioned block 354. The first partitioned block 351 according to an embodiment is a block represented by the block partitioning type of the block 310 of a non-partitioned type, and the second partitioned block 352 is a block represented by block partitioning type of the block 340 of a quad-partitioned type. The one coding block may be partitioned into one or more blocks, and the partitioned blocks may be repeatedly partitioned. The second partitioned block 352 is quad-partitioned to form four sub-partitioned blocks, and each sub-partitioned block indicates a block represented by block partitioning type of the non-partitioned block 310. The third partitioned block 353 is a block represented by the block partitioning type of the horizontally partitioned block 320, and the lower end rectangular block 356 of the sub-partitioned blocks is a block represented by block partitioning type of the vertically partitioned block 330. The fourth partitioned block 354 is a block represented by block partitioning type of the quad-partitioned block 340, and a first sub-partitioned block and a third sub-partitioned block of the fourth partitioned block are blocks represented by block partitioning type of the vertically partitioned block 330. Herein, the third sub-partitioned block represents an embodiment in which additional vertical partitioning is performed.

Figure 4:
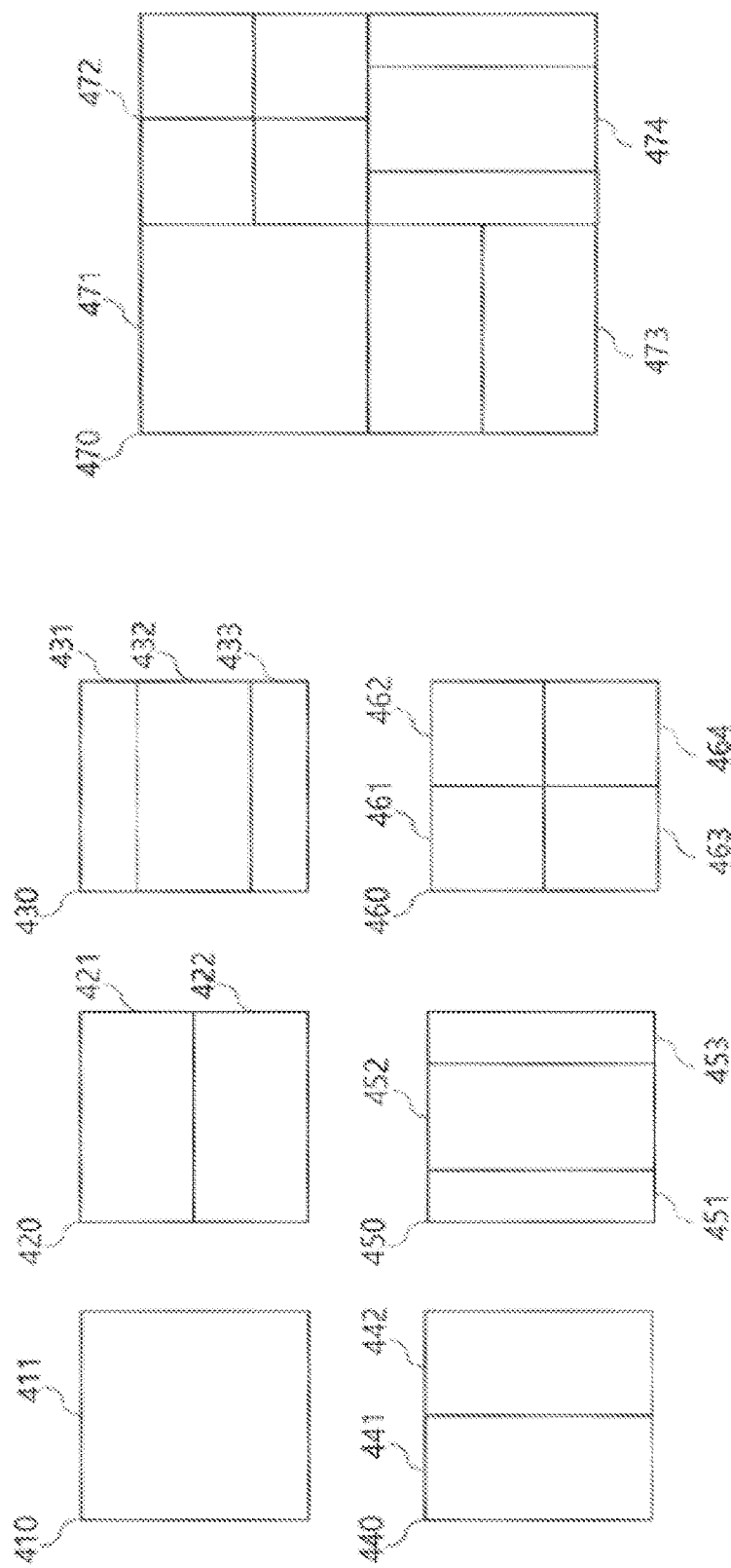
FIG. 4 is a conceptual diagram illustrating a block partitioning structure in which bi-partitioning, tri-partitioning, and quad-partitioning are combined according to an embodiment of the present invention.

FIG. 4 is a conceptual diagram illustrating a block partitioning structure in which bi-partitioning, tri-partitioning, and quad-partitioning are combined according to an embodiment of the present invention.

A video coding method and apparatus using a block partitioning structure in which bi-partitioning, tri-partitioning, and quad-partitioning are combined according to an embodiment of the present invention includes block partitioning types of a non-partitioned block 410, a horizontally bi-partitioned block 420, a horizontally tri-partitioned block 430, a vertically bi-partitioned block 440, vertically tri-partitioned block 450, and a horizontally and vertically quad-partitioned block 460, and a block structure 470 of a type in which the bi-partitioning, the tri-partitioning, and the quad-partitioning are combined.

According to an embodiment of the present invention, the non-partitioned block 410 includes a type in which one coding block is not partitioned, and the horizontally bi-partitioned block 420 includes a first partitioned block 421 and a second partitioned block 422 acquired by equally partitioning one coding block in a horizontal direction. In addition, according to an embodiment of the present invention, the vertically bi-partitioned block 440 includes a first partitioned block 441 and a second partitioned block 442 acquired by equally partitioning one coding block in a vertical direction.

According to an embodiment of the present invention, the horizontally tri-partitioned block 430 includes a first partitioned block 431 and a third partitioned block 433 having a ¼ vertical size with respect to the vertical size of the entire block 430, and a second partitioned block 432 having a ½ vertical size with respect to the vertical size of the entire block 430. In addition, according to an embodiment of the present invention, the vertically tri-partitioned block 450 may include a first partitioned block 451 and a third partitioned block 453 having a ¼ horizontal size with respect to the horizontal size of the entire block 450, and a second partitioned block 452 having a ½ horizontal size with respect to the horizontal size of the entire block 450.

According to an embodiment of the present invention, the horizontally and vertically quad-partitioned block 460 may include a first partitioned block 461, a second partitioned block 462, a third partitioned block 463, and a fourth partitioned block 464 in which the horizontal size and the vertical size of the entire block 460 is equally partitioned.

According to one embodiment of the present invention, a block structure 470 of a type in which the bi-partitioning, the tri-partitioning, and the quad-partitioning are combined includes a block structure in which block partitioning types such as the bi-partitioned blocks 420 and 440, the tri-partitioned block 430 and 450, and the quad-partitioned block 460 are combined. In the block structure 470 of a type in which the bi-partitioning, the tri-partitioning, and the quad-partitioning are combined, the most upper block 470 is quad-partitioned into a first partitioned block 471, a second partitioned block 472, a third partitioned block 473, and a fourth partitioned block 474. The first partitioned block 471 according to an embodiment is a block represented by the block partitioning type of the non-partitioned block 410, the second partitioned block 472 is a block represented by the block partitioning type of the quad-partitioned block 460, the third partitioned block 473 is a block represented by a block partitioning type of the horizontally bi-partitioned block 420, and a fourth partitioned block 474 is a block represented by a block partitioning type of the vertically tri-partitioned block 450. The one coding block may be partitioned into one or more blocks, and the sub-partitioned blocks may be repeatedly partitioned. The second partitioned block 472 may be quad-partitioned to form four sub-partitioned blocks, and each sub-partitioned block indicates a block represented by block partitioning type of the non-partitioned block 410.

Figure 5:
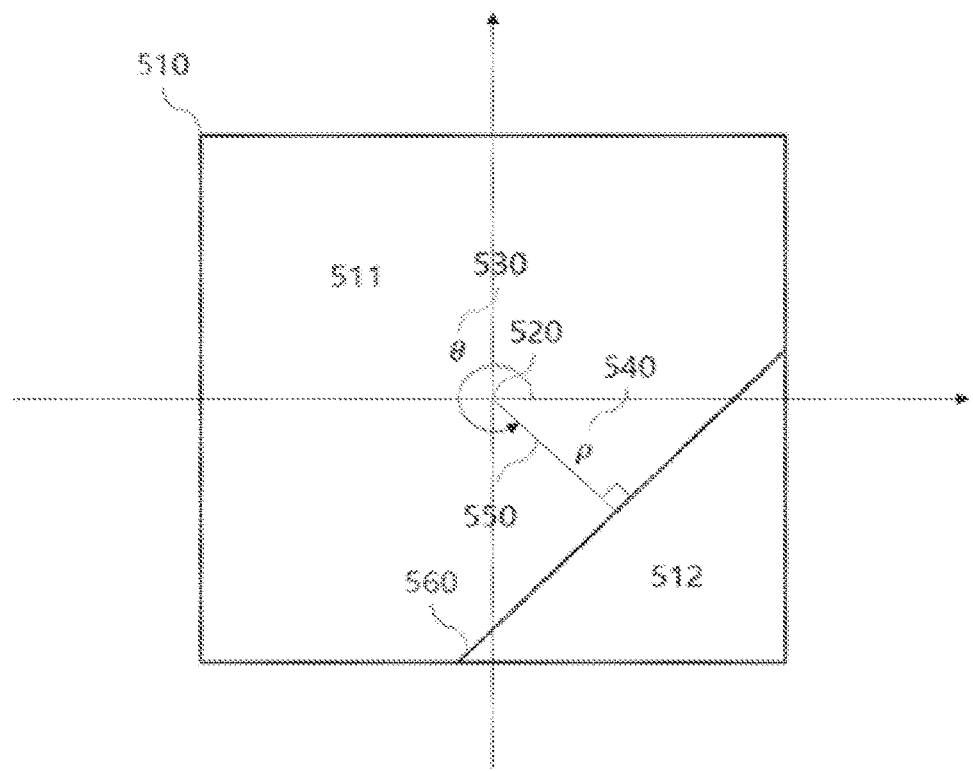
FIG. 5 is a conceptual diagram illustrating arbitrary block partitioning according to an embodiment of the present invention.

FIG. 5 is a conceptual diagram illustrating arbitrary block partitioning according to an embodiment of the present invention.

In the video coding method and apparatus using arbitrary block partitioning according to an embodiment of the present invention, the arbitrary block partitioning includes partitioning one non-partitioned coding block 510 into a first partitioned block 511 and a second partitioned block 512 on the basis of a line segment 560 orthogonal to the line segment 550 having a predetermined angle 530 and a predetermined distance 540 with respect to a block center 520.

The block center 520 according to an embodiment of the present invention indicates a single virtual point having a y-coordinate of a ½ position of a vertical size and an x-coordinate of a ½ position of a horizontal size for the one non-partitioned coding block 510. According to an embodiment of the present invention, the predetermined angle 530 indicates art angle that rotates counterclockwise to the line segment 550 about a virtual horizontal axis based on the block center 520, and the predetermined distance 540 indicates a distance between the line segment 560 partitioning the block and the block center 520.

The line segment 560 partitioning the block according to an embodiment is a line segment partitioning the one non-partitioned coding block 510, and the video coding method and apparatus using arbitrary block partitioning is provided such that one coding block 510 is partitioned into two blocks performing independent prediction, i.e., a first partitioned block 511 and a second partitioned block 512 on the basis of the line segment 560 partitioning the block. The first partitioned block 511 and the second partitioned block 512, which are two blocks partitioned by arbitrary block partitioning, perform encoding and decoding on pixels included in each block using different prediction information.

Figure 6:
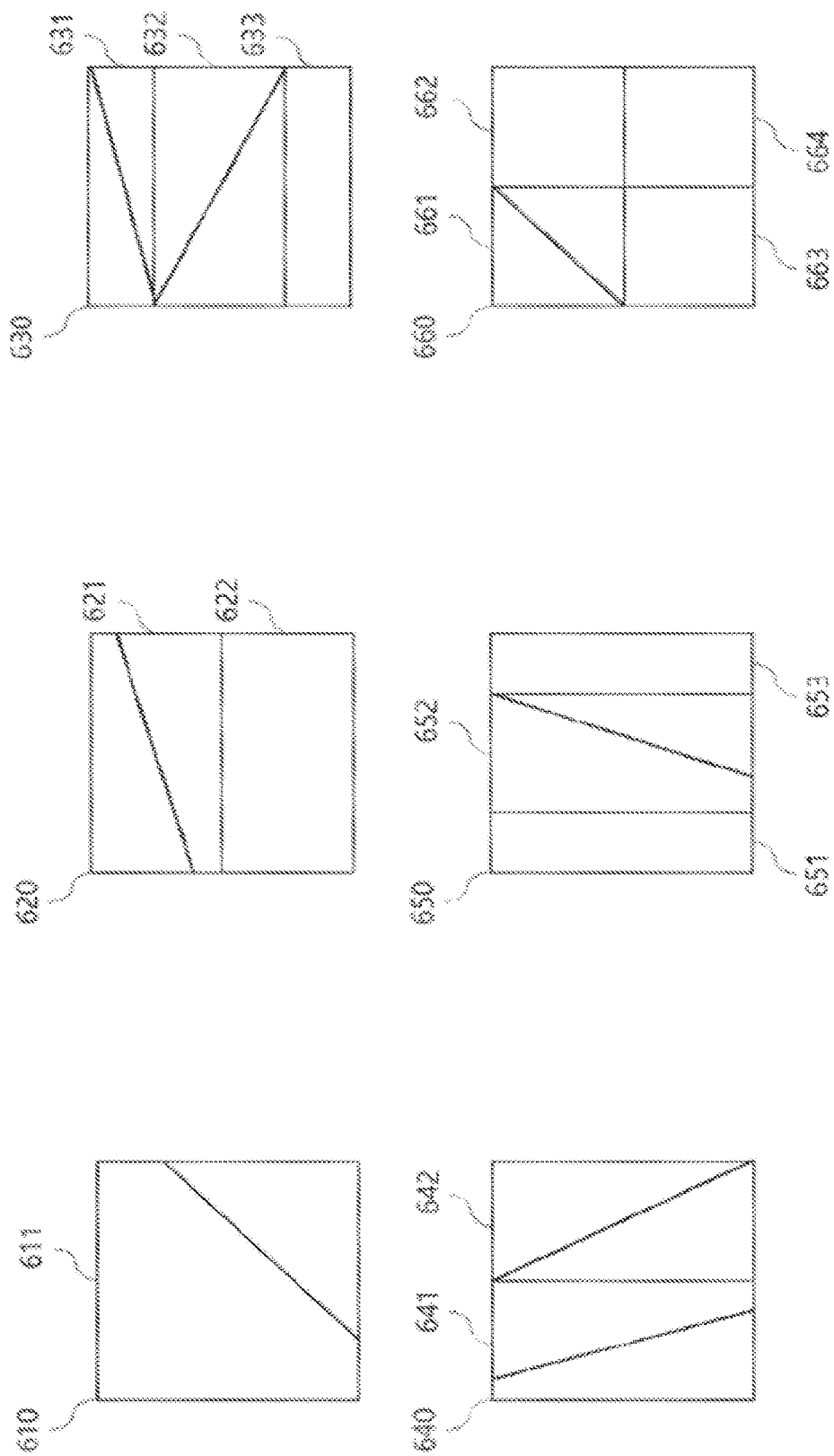
FIG. 6 is a conceptual diagram illustrating a block partitioning structure in which various block partitioning types and arbitrary block partitioning are combined according to an embodiment of the present invention.

FIG. 6 is a conceptual diagram illustrating a block partitioning structure in which various block partitioning types and arbitrary block partitioning are combined according to an embodiment of the present invention.

The video coding method and apparatus using arbitrary block partitioning according to an embodiment of the present invention may partition each of coding blocks 610, 620, 630, 640, 650, and 660 into one or more sub-coding blocks by performing bi-partitioning, tri-partitioning, and quad-partitioning, and the one or more partitioned coding blocks may be partitioned by arbitrary block partitioning.

One coding block 610 according to an embodiment of the present invention is a block which is not partitioned using bi-partitioning, tri-partitioning, and quad-partitioning, and the block may be partitioned by arbitrary block partitioning. As an example of FIG. 6, a coding block 620 may be horizontally partitioned into a first partitioned block 621 and a second partitioned block 622, in which the first partitioned block 621 shown in FIG. 6 represents a block that is partitioned by arbitrary block partitioning, and the second partitioned block 622 represents a block that is not partitioned by arbitrary block partitioning. As shown in FIG. 6, when one coding block is partitioned into one or more sub-coding blocks, the sub-coding blocks may include blocks that are partitioned by arbitrary block partitioning and blocks that are non-partitioned by arbitrary block partitioning.

FIG. 7 is a table illustrating a syntax using arbitrary block partitioning in a block structure of a form in which bi-partitioning and quad-partitioning are combined according to an embodiment of the present invention.

The syntax information used in the video coding method and apparatus using arbitrary block partitioning according to an embodiment of the present invention includes partitioning information 710 on whether to perform block quad-partitioning, partitioning information 720 on whether to perform block bi-partitioning for the non-quad-partitioned block, direction information 730 on a direction of block bi-partitioning, information 740 on whether to perform arbitrary block partitioning, information 750 on an angle of arbitrary block partitioning, and information 760 on a distance of arbitrary block partitioning. When one block is not quad-partitioned according to the partitioning information 710 on whether to perform quad-partitioning, it is determined whether bi-partitioning is performed for the block through the information 720 on whether to perform bi-partitioning. When one coding block is bi-partitioned according to the information 720 on whether to perform block bi-partitioning, the direction information 730 on the direction of block bi-partitioning is acquired. When the block is not bi-partitioned, information on arbitrary block partitioning is acquired. When the block is not bi-partitioned, the acquired information of arbitrary block partitioning includes the information 740 on whether to perform arbitrary block partitioning, and when the information 740 on whether to perform arbitrary block partitioning indicates partitioning, the information 750 on the angle of additional block partitioning and the information 760 on the distance thereof are additionally acquired.

In the video coding method and apparatus according to an embodiment of the present invention, when the block partitioning information is used in combination, the syntax shown in FIG. 7 includes confirming whether to perform arbitrary block partitioning and then performing block partitioning using arbitrary block partitioning, only when bi-partitioning and quad-partitioning are no longer performed in the process of performing bi-partitioning and quad-partitioning on one coding block.

FIG. 8 is a table illustrating a syntax using arbitrary block partitioning in a block structure of a form in which bi-partitioning, tri-partitioning, and quad-partitioning are combined according to an embodiment of the present invention.

The syntax information used in the video coding method and apparatus using arbitrary block partitioning according to an embodiment of the present invention includes partitioning information 810 on whether to perform block quad-partitioning, partitioning information 820 on whether to perform block bi-partitioning and block tri-partitioning additionally for the non-quad-partitioned block, direction information 830 on a direction of block bi-partitioning and block tri-partitioning, partitioning information 840 on a partitioning type of block bi-partitioning and block tri-partitioning, information 850 on whether to perform arbitrary block partitioning, information 860 on an angle of arbitrary block partitioning, and information 870 on a distance of arbitrary block partitioning. When one block is not quad-partitioned according to the information 810 on whether to perform quad-partitioning, it is determined whether bi-partitioning and tri-partitioning is performed for the block through the information 820 on whether to perform bi-partitioning and tri-partitioning for the block. When one coding block is bi-partitioned and tri-partitioned according to the information 820 on whether to perform bi-partitioning and tri-partitioning, the direction information 830 on the direction of bi-partitioning and tri-partitioning and the partitioning information 840 indicating one of bi-partitioning and tri-partitioning are acquired. When the block is not bi-partitioned and tri-partitioned, information on arbitrary block partitioning is acquired. When the block is not bi-partitioned and tri-partitioned, the acquired information of arbitrary block partitioning includes the information 850 on whether to perform arbitrary block partitioning, and when the information 850 indicates partitioning, the information 860 on the angle for additional block partitioning and the information 870 on the distance thereof are additionally acquired.

In the video coding method and apparatus according to an embodiment of the present invention, when the block partitioning information is used in combination, the syntax shown in FIG. 8 includes confirming whether to perform arbitrary block partitioning and then performing block partitioning using arbitrary block partitioning, only when bi-partitioning, tri-partitioning, and quad-partitioning are no longer performed in the process of performing bi-partitioning, tri-partitioning, and quad-partitioning for one coding block.

Figure 10:
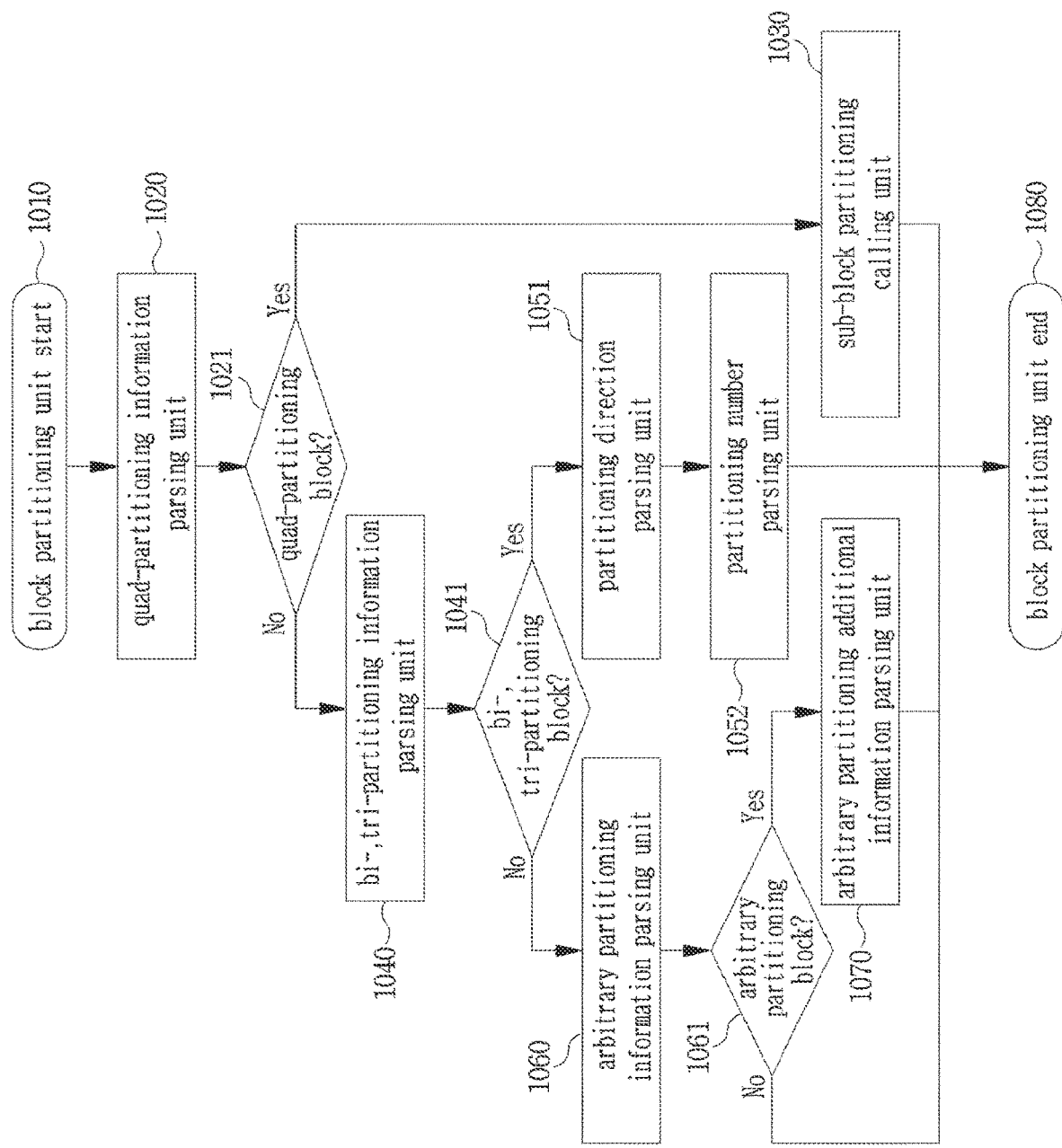
FIG. 10 is a flowchart illustrating the use of arbitrary block partitioning in a block structure of a form in which bi-partitioning, tri-partitioning, and quad-partitioning are combined according to an embodiment of the present invention.

FIG. 10 is a flowchart illustrating the use of arbitrary block partitioning in a block structure of a form in which bi-partitioning, tri-partitioning, and quad-partitioning are combined according to an embodiment of the present invention.

In the video coding method and apparatus using arbitrary block partitioning according to an embodiment of the present invention, a block partitioning unit for acquiring information on block partitioning and performing partitioning includes a quad-partitioning information parsing unit 1020, a sub-block partitioning calling unit 1030, a bi-, tri-partitioning information parsing unit 1040, a partitioning direction parsing unit 1051, partitioning number parsing unit 1052, an information parsing unit 1060 for arbitrary partitioning, and an additional information parsing unit 1070 for arbitrary partitioning.

The quad-partitioning information parsing unit 1020 acquires block quad-partitioning information by parsing block partitioning information on whether to perform quad-partitioning for the block from a bitstream.

When the block quad-partitioning information acquired by the quad-partitioning information parsing unit 1020 indicates four partitions, the sub-block partitioning calling unit 1030 serves to call sub-block partitioning in order to perform sub-block partitioning for four sub-blocks.

When the block quad-partitioning information acquired by the quad-partitioning information parsing unit 1020 does not indicate four partitions, the bi-, tri-partitioning information parsing unit 1040 acquires block bi-partitioning and tri-partitioning information by parsing block partitioning information on whether to perform bi-partitioning and tri-partitioning for the block from a bitstream.

When the block bi-partitioning and tri-partitioning information acquired by the bi-, tri-partitioning information parsing unit 1040 indicates two partitions and three partitions, the partitioning direction parsing unit 1051 acquires the direction information indicating a direction of block bi-partitioning and tri-partitioning, that is, one of a vertical direction and a horizontal direction.

When the block bi-partitioning and tri-partitioning information acquired by the bi-, tri-partitioning information parsing unit 1040 indicates two partitions and three partitions, the partitioning number parsing unit 1052 acquires the block number information indicating the partitioning number of block bi-partitioning and tri-partitioning, that is, one of bi-partitioning and tri-partitioning is acquired.

When the block bi-partitioning and tri-partitioning information acquired by the bi-, tri-partitioning information parsing unit 1040 does not indicate two partitions and tri-partitioning, the information parsing unit 1060 for arbitrary partitioning determines whether arbitrary partitioning is performed in the current coding block.

When arbitrary partitioning information acquired by the information parsing unit 1060 for arbitrary partitioning performs arbitrary partitioning for the current coding block, the additional information parsing unit 1070 for arbitrary partitioning acquires additional information on arbitrary partitioning. The additional information for arbitrary partitioning may include angle and distance information used for arbitrary partitioning.

The present invention can be used for manufacturing such as broadcasting equipment manufacturing, terminal manufacturing, and the like, and industries related to source technology.

The invention claimed is:

1. A video decoding method, comprising:
acquiring quad-partitioning information of a block;
acquiring non-quad-partitioning information of the block in case the acquired quad-partitioning information of the block does not indicate that the block is divided into four partitions;
dividing, based on the non-quad-partitioning information or the quad-partitioning information, the block into a plurality of partitions;
generating a prediction partition of a current partition among the plurality of partitions by performing prediction for the current partition;
generating a residual partition of the current partition by performing inverse quantization and inverse transform for the current partition; and
reconstructing the current partition based on the prediction partition and the residual partition,
wherein the non-quad-partitioning information includes partitioning direction information indicating whether a partitioning direction of the non-quad-partitioning for the block is a vertical direction or a horizontal direction and partitioning number information indicating whether the non-quad-partitioning for the block is a bi-partitioning or a tri-partitioning,
wherein the bi-partitioning is a partitioning type of dividing the block into two partitions of a same size and partitioning depth and the tri-partitioning is a partitioning type of dividing the block into three partitions of a same partitioning depth,
wherein a center partition of the three partitions has a size equal to a sum of a size of the other two of the three partitions, and the other two of the three partitions have a same size,
wherein the partitioning number information is acquired after acquiring the partitioning direction information, and
wherein the partitioning direction information and the partitioning number information are both 1 bit flags, respectively.

2. The method of claim 1, further comprising:
determining, based on information on whether to perform a geometric partitioning, whether to perform the geometric partitioning for a partition,
wherein the partition is one of the plurality of partitions divided by the bi-partitioning or the tri-partitioning from the block, and
wherein the geometric partitioning is performed only when the bi-partitioning and the tri-partitioning is no longer performed for the partition; and
in response to the determination to perform the geometric partitioning, dividing, based on the geometric partitioning, the partition into two sub-partitions,
wherein the geometric partitioning is a partitioning type of dividing the partition by using a particular line specified based on geometric partitioning information.

3. The method of claim 2, wherein the geometric partitioning information includes partitioning angle information and partitioning distance information for the particular line.

4. The method of claim 3, wherein the partitioning angle information is information for indicating an angle of the particular line, and
wherein the partitioning distance information is information for indicating a distance from a center of the partition to the particular line.

5. The method of claim 2, wherein at least one of the two sub-partitions is a triangular partition.

6. A video encoding method, comprising:
encoding quad-partitioning information of a block;

encoding non-quad-partitioning information of the block in case the block is not divided into four partitions;

dividing, based on the non-quad-partitioning information or the quad-partitioning information, the block into a plurality of partitions;

generating a prediction partition of a current partition among the plurality of partitions by performing prediction for the current partition;

generating a residual partition of the current partition by performing inverse quantization and inverse transform for the current partition; and reconstructing the current partition based on the prediction partition and the residual partition, wherein the non-quad-partitioning information includes partitioning direction information indicating whether a partitioning direction of the non-quad-partitioning for the block is a vertical direction or a horizontal direction and partitioning number information indicating whether the non-quad-partitioning for the block is a bi-partitioning or a tri-partitioning, wherein the bi-partitioning is a partitioning type of dividing the block into two partitions of a same size and partitioning depth and the tri-partitioning is a partitioning type of dividing the block into three partitions of a same partitioning depth, wherein a center partition of the three partitions has a size equal to a sum of a size of the other two of the three partitions, and the other two of the three partitions have a same size, wherein the partitioning number information is encoded after encoding the partitioning direction information, and wherein the partitioning direction information and the partitioning number information are both 1 bit flags, respectively.

7. The method of claim 6, further comprising:

determining whether to perform a geometric partitioning for a partition, information on whether to perform the geometric partitioning being encoded into a bitstream, wherein the partition is one of the plurality of partitions divided by the bi-partitioning or the tri-partitioning from the block, and wherein the geometric partitioning is performed only when the bi-partitioning and the tri-partitioning is no longer performed for the partition; and in response to the determination to perform the geometric partitioning, dividing, based on the geometric partitioning, the partition into two sub-partitions, wherein the geometric partitioning is a partitioning type of dividing the partition by using a particular line, geometric partitioning information specifying the particular line is encoded into the bitstream.

8. The method of claim 7, wherein the geometric partitioning information includes partitioning angle information and partitioning distance information for the particular line.

9. The method of claim 8, wherein the partitioning angle information is information for indicating an angle of the particular line, and wherein the partitioning distance information is information for indicating a distance from a center of the partition to the particular line.

10. The method of claim 7, wherein at least one of the two sub-partitions is a triangular partition.

11. A method for transmitting a bitstream comprising:

encoding quad-partitioning information of a block into the bitstream;

encoding non-quad-partitioning information of the block into the bitstream in case the block is not divided into four partitions;

dividing, based on the non-quad-partitioning information or the quad-partitioning information, the block into a plurality of partitions;

generating a prediction partition of a current partition among the plurality of partitions by performing prediction for the current partition;

generating a residual partition of the current partition by performing inverse quantization and inverse transform for the current partition;

reconstructing the current partition based on the prediction partition and the residual partition; and transmitting the bitstream, wherein the non-quad-partitioning information includes partitioning direction information indicating whether a partitioning direction of the non-quad-partitioning for the block is a vertical direction or a horizontal direction and partitioning number information indicating whether the non-quad-partitioning for the block is a bi-partitioning or a tri-partitioning, wherein the bi-partitioning is a partitioning type of dividing the block into two partitions of a same size and partitioning depth and the tri-partitioning is a partitioning type of dividing the block into three partitions of a same partitioning depth, wherein a center partition of the three partitions has a size equal to a sum of a size of the other two of the three partitions, and the other two of the three partitions have a same size, wherein the partitioning number information is encoded after encoding the partitioning direction information, and wherein the partitioning direction information and the partitioning number information are both 1 bit flags, respectively.

12. The method of claim 11, wherein the method further comprises:

determining whether to perform a geometric partitioning for a partition, information on whether to perform the geometric partitioning being encoded into the bitstream, wherein the partition is one of the plurality of partitions divided by the bi-partitioning or the tri-partitioning from the block, and wherein the geometric partitioning is performed only when the bi-partitioning and the tri-partitioning is no longer performed for the partition; and in response to the determination to perform the geometric partitioning, dividing, based on the geometric partitioning, the partition into two sub-partitions, wherein the geometric partitioning is a partitioning type of dividing the partition by using a particular line, geometric partitioning information specifying the particular line is encoded into the bitstream.

13. The method of claim 12, wherein the geometric partitioning information includes partitioning angle information and partitioning distance information for the particular line.

14. The method of claim 13, wherein the partitioning angle information is information for indicating an angle of the particular line, and wherein the partitioning distance information is information for indicating a distance from a center of the partition to the particular line.

15. The method of claim 12, wherein at least one of the two sub-partitions is a triangular partition.

\* \* \* \* \*